US008665446B2

(12) United States Patent
Brixner et al.

(10) Patent No.: US 8,665,446 B2
(45) Date of Patent: Mar. 4, 2014

(54) APPARATUS AND METHOD FOR COHERENT MULTI-DIMENSIONAL OPTICAL SPECTROSCOPY

(75) Inventors: Tobias Brixner, Gerbrunn (DE); Ulrike Selig, Gerbrunn (DE); Florian Langhojer, Frankfurt am Main (DE); Frank Dimler, Niederstetten (DE)

(73) Assignee: Julius-Maximilians-Universitat Wurzburg, Wurzburg (DE)

( * ) Notice: Subject to any disclaimer, the term of this patent is extended or adjusted under 35 U.S.C. 154(b) by 508 days.

(21) Appl. No.: 12/994,607

(22) PCT Filed: May 7, 2009

(86) PCT No.: PCT/EP2009/003274
§ 371 (c)(1),
(2), (4) Date: Feb. 28, 2011

(87) PCT Pub. No.: WO2009/143957
PCT Pub. Date: Dec. 3, 2009

(65) Prior Publication Data
US 2011/0141467 A1      Jun. 16, 2011

(30) Foreign Application Priority Data

May 26, 2008   (DE) .......................... 10 2008 025 170

(51) Int. Cl.
*G01J 3/453* (2006.01)
(52) U.S. Cl.
USPC ...................................................... 356/451
(58) Field of Classification Search
USPC .............................................. 356/484, 450
See application file for complete search history.

(56) References Cited

U.S. PATENT DOCUMENTS 4,996,412 A * 2/1991 Anafi et al. ................. 250/201.9
5,663,973 A * 9/1997 Stamm et al. .................. 372/20
(Continued)

FOREIGN PATENT DOCUMENTS

DE    10 2008 025 170     11/2009
WO    WO 2007/064830       6/2007
WO    WO 2009/143957      12/2009

OTHER PUBLICATIONS

Victor Volkov.Active phase stabilization in Fourier-transform two-dimensional infrared spectroscopy.Optics Letters / vol. 30, No. 15, Aug. 1, 2005.*
(Continued)

*Primary Examiner* — Gregory J Toatley
*Assistant Examiner* — Maurice Smith
(74) *Attorney, Agent, or Firm* — RatnerPrestia

(57) ABSTRACT

An apparatus and a method for coherent multi-dimensional optical spectroscopy employs a beam splitter for splitting a base light pulse into at least first to fourth light pulses, three of which are suitable for interaction with a sample, lens system focuses the first to fourth light pulses at a sample site, and an optical delay varies the arrival times of the first to fourth light pulses at the sample. A detector detects an interference signal. The beam splitter is a non-diffractive optical element. The light pulses, at least along part of their light paths, are guided pairwisely such that changes in the optical path length due to vibration of the beam splitter or due to the delay element are identical for each pair of pulses, where the pulse pairs compensate for any change in the interference signal due to a change of the arrival times of the pair of pulses.

20 Claims, 9 Drawing Sheets

(56) References Cited

U.S. PATENT DOCUMENTS 5,832,362 A * 11/1998 Trokhan ............ 422/186.3
7,760,342 B2 * 7/2010 Zanni et al. ............ 356/51
2006/0063188 A1 3/2006 Zanni et al.

OTHER PUBLICATIONS

Cowan. Two-dimensional spectroscopy using diffractive optics based phased-locked photon echoes. Chemical Physics Letters 386. p. 4.7 Feb. 2004.*
International Preliminary Report on Patentability dated Dec. 16, 2010.
Cowan et al., "Two-Dimensional Spectroscopy Using Diffractive Optics Based Phased-Locked Photon Echoes", Chemical Physics Letters, vol. 386, Jan. 1, 2004, pp. 184-189.
Brixner et al., "Phase-Stabilized Two-Dimensional Electronic Spectroscopy", Journal of Chemical Physics, American Institute of Physics, vol. 121, Jan. 1, 2004, pp. 4221-4236.
Nemeth et al., "Compact Phase-Stable Design for Single—and Double-Quantum Two-Dimensional Electronic Spectroscopy", Optics Letters Optical Society of America, vol. 34, No. 21, Nov. 1, 2009, pp. 3301-3303.
Selig et al., "Inherently Phase-Stable Coherent Two-Dimensional Spectroscopy Using Only Conventional Optics", Optics Letters Optical Society of America, vol. 33, No. 23, Dec. 1, 2008, pp. 2851-2853.
Gundogdu et al., "Multidimensional Coherent Spectroscopy Made Easy", Chemical Physics, vol. 341, No. 1-3, Nov. 6, 2007, pp. 89-94.
Brixner et al., "Two-Dimensional Spectroscopy of Electronic Couplings in Photosynthesis", Nature 434, 625 (2005).
Jonas et al., "Two-Dimensional Femtosecond Spectroscopy", Annual Ref. Phys. Chem 2003, vol. 54, pp. 425-463.
Minhaeng Cho, "Coherent Two-Dimensional Optical Spectroscopy", Chem Rev. 2008, 108 pp. 1331-1418.
Woutersen et al., Structure Determination of Trialanine in Water Using Polarization Sensitive Two-Dimensional Vibrational Spectroscopy, Journal of Physical Chemistry B 104, 11316 (2000).
Hochstrasser et al., "Structure of the Amide I Band of Peptides Measured by Femtosecond Nonlinear-Infrared Spectroscopy", Journal of Physical Chemistry B 102 6123 (1998).
Tokmakoff et al., "Coherent 2D IR Spectroscopy: Molecular Structure and Dynamics in Solution", Journal of Physical Chemistry A 107, 5258 (2003).
Hybl et al., "Two-Dimensional Fourier Transform Electronic Spectroscopy", Journal of Chemical Physics, vol. 115, No. 14, Oct. 8, 2001, pp. 6606-6622.
Brixner et al., "Tunable Two-Dimensional Femtosecond Spectroscopy", Optics Letters 29, 884 (2004).
Zhang et al., "Optical Two-Dimensional Fourier Transform Spectroscopy With Active Interferometric Stabilization", Optics Express, vol. 13, No. 19, Sep. 19, 2005, pp. 7432-7441.
Prokhorenko et al., "Coherently-Controlled Two-Dimensional Photon Echo Electronic Spectroscopy", Optics Express 17, 9764 (2009).
Hornung et al., "Degenerate Four-Wave Mixing Spectroscopy Based on Two-Dimensional Femtosecond Pulse Shaping", Optics Letters 29, 2052 (2004).
Demrauer et al, "Facile Collection of Two-Dimensional Electronic Spectra Using Femtosecond Pulse-Shaping Technology", Optics Express 15, 16681 (2007).
Tseng et al., "Measurement of Complex $X^{(3)}$ Using Degenerate Four-Wave Mixing With an Imaged 2-D Phase Grating", Opt. Express 14, 8737 (2006).
Tauber et al., "Flowing Liquid Sample Jet for Resonance Raman and Ultrafast Optical Spectroscopy", Rev. of Scient. Instr. 74, 11 (2003).
Laimgruber et al., "A Femtosecond Stimulated Raman Spectrograph for the Near Ultraviolet", Appl. Phys. B 85, 557 (2006).
European Search Report dated May 18, 2010.
International Search Report dated Jul. 31, 2009.

* cited by examiner

APPARATUS AND METHOD FOR COHERENT MULTI-DIMENSIONAL OPTICAL SPECTROSCOPY

This application claims priority of PCT International Application No. PCT/EP2009/003274 filed on May 7, 2009, the contents of which are incorporated herein by reference.

FIELD OF THE INVENTION

The present invention relates to an apparatus and a method for coherent multi-dimensional optical spectroscopy. Herein, the expression "optical spectroscopy" refers to spectroscopy in infrared (IR), visible and ultraviolet (UV) spectral regions.

BACKGROUND OF THE INVENTION

Optical spectroscopy allows insights in the structure of matter on an atomic scale. While linear spectroscopy is predominantly used for observing static states, non-linear, time-resolved methods are suitable for examining dynamical processes. However, the well-established time-resolved techniques such as transient absorption spectroscopy and transient grating spectroscopy are limited to the measurement of quantum mechanical populations, while the underlying reason for dynamical changes of the quantum mechanical system, namely the coupling between quantum mechanical states, are not accessible via such spectroscopic methods.

This deficiency is overcome by multi-dimensional spectroscopy, and in particular by the so-called coherent two-dimensional (2D) spectroscopy, to which specific reference will be made in the following. By systematically varying the time delays between three excitation laser pulses and the complete measurement of the non-linear optical response direct information with respect to the couplings between quantum states can be obtained, and this for example allows to determine energy transfer processes in complex systems with a spatial resolution in the nanometer regime and a time resolution in the femtosecond regime.

The results of such a measurement may be arranged in intuitively understandable 2D spectra, in which the emission frequency of the system is plotted versus the original excitation frequency. The intensities of this two-dimensional spectrum which lie off the diagonal axis, i.e. intensities for which the excitation and emission frequencies are different from each other are indicative of couplings and transfer between individual energy states. Using 2D spectroscopy, one obtains the complete spectroscopical information up to third order, and all conventional spectroscopy techniques such as transient absorption etc. are automatically included therein.

While 2D spectroscopy is by far the most common kind of multi-dimensional spectroscopy, it is nevertheless possible to use a higher number of excitation pulses and to generate higher dimensional spectra. For example, five excitation pulses have been used in order to generate a fifth order signal. For simplicity, the present specification focuses on the case of 2D spectroscopy, but it is to be understood that the principles discussed herein can equally be employed for higher dimensional spectroscopy.

An example illustrating such kind of 2D spectra is shown in FIG. 1, which has been taken from T. Brixner, J. Stenger, H. M. Vaswani, M. Cho, R. E. Blankenship, and G. R. Fleming. "Two-dimensional spectroscopy of electronic couplings in photosynthesis", *NATURE*, 434:625-629, March 2005. Diagrams a, b and c of FIG. 1 show the 2D spectra of the Fenna-Matthews-Olsen (FMO)-Baterichlorophyll-a-protein of green sulphur bacteria, which serves both, as an antenna molecule for harvesting light energy as well as a mediator for guiding light excitations from the chlorosome antenna to the reaction centre. The horizontal axis in the diagrams a to c of FIG. 1 corresponds to the absorption frequency $\omega_t$, and the vertical axis corresponds to the emission frequency $\omega_r$. The 2D spectra of diagrams a to c correspond to population times T of 0 femtoseconds (fs), 200 fs and 1000 fs, respectively, where the "population time" is the time between the second and third excitation light pulses.

Diagram d shows the experimentally determined linear absorption spectrum (solid line) as compared with its theoretically determined counterpart as well as exciton contributions (chain-dotted lines). Diagrams e and f show simulations of 2D spectra for population times of T=200 fs and T=1000 fs, respectively. In the 2D spectra of FIG. 1, intensities A and B can be seen which do not lie on the diagonal axis and which are therefore indicative of couplings between quantum states.

The reason for the off-diagonal intensities A and B, the so-called "cross-peaks" is that the structural components of the macromolecule, to which peaks A and B correspond, are aware of each other. This means that the structural components are so close to each other that they are quantum mechanically coupled, and the pulse sequence induces transitions therebetween. To be precise, the intensity in the 2D spectrum corresponds to the probability that a photon having a frequency $\omega_t$ is absorbed and is re-emitted, after a population time T, at a frequency $\omega_r$. This type of information can not be discerned from a one-dimensional spectrum, and this illustrates the unique information provided by 2D spectra.

Optical 2D spectroscopy is in many respects analogous to 2D nuclear magnetic resonance, which has become an inevitable indispensable standard method for structure analysis of molecules and which is employed in practically any chemical analysis laboratory using commercially available apparatuses. "Nuclear magnetic resonance is based on couplings of nuclear spins of single atoms and accordingly reflects their molecular structure. As can be seen from the above description of FIG. 1, optical 2D spectroscopy is sensitive for couplings of complete chromophores, i.e. couplings of larger molecular units or functional groups and accordingly reflects the structure of supramolecular configurations, which are relevant for a number of important technical and scientific applications, for example applications in the field of organic photovoltaics, natural and artificial photosynthesis complexes, quantum dot systems, pigment complexes, aggregated π-complexes etc.

For a comprehensive explanation of the fundamental principles of coherent two-dimensional optical spectroscopy, reference is made to the review article "Two-dimensional femtosecond spectroscopy" by David M. Jonas, Annual Ref. Phys. Chem. 2003, Vol. 54, 425-463 as well as review article "Coherent two-dimensional optical spectroscopy" by Minhaeng Cho, Chem. Rev. 2008, 108: 1331-1418 and the references cited therein.

Ever since the pioneer works of Hamm et al. (S. Woutersen and P. Hamm. "Structure determination of trialanine in water using polarization sensitive two-dimensional vibrational spectroscopy", *JOURNAL OF PHYSICAL CHEMISTRY B*, 104:11316-11320, November 2000), Hochstrasser et al. (P. Hamm, M. H. Lim and R. M. Hochstrasser. "Structure of the amide i band of peptides measured by femtosecond nonlinear-infrared spectroscopy", *JOURNAL OF PHYSICAL CHEMISTRY B*, 102:6123-6138, July 1998) and Tokmakoff et al. (M. Khalil, N. Demirdöven and A. Tokmakoff, "Coherent 2D IR spectroscopy: Molecular structure and dynamics in solution, *JOURNAL OF PHYSICAL CHEMISTRY A*, 107: 5258-5279, July 2003), coherent optical 2D spectroscopy in the IR spectral range can be regarded as an established method. FIG. 2 schematically shows the setup of a 2D experiment which has been taken from the above referenced publication of Tokmakoff et al. In FIG. 2, the first, second and third excitation pulses are referenced at $\alpha$, $\beta$ and $\chi$, respectively. The individual beams are generated from the original incoming beam using beam splitters, which are referenced in FIG. 2 as "BS". In addition, a fourth beam is generated which is referenced as "LO" and represents a local oscillator signal. As will be explained in more detail below, the LO-signal is superposed with a third order signal resulting from an interaction of the first, second and third pulses with the sample, to allow for a heterodyne detection. The timing of the first to third pulses and the LO-pulse can be adjusted using ordinary delay lines comprising movable mirrors.

While the set up of FIG. 2 is designed for IR spectroscopy, many interesting systems require spectroscopy in the visible spectral range (500 nm-750 nm). This is for example true for biological systems, organic solar cells and artificial photosynthesis complexes. For such short wave lengths, the setup of FIG. 2 is not suitable, since any variation in the optical wavelength, which can not be avoided with the setup of FIG. 2 will lead to a ten times higher phase error since the wavelength is ten times shorter as compared to IR, thus introducing errors to the signals. In other words, the setup of FIG. 2 which in case of IR-spectroscopy in many cases provides a satisfactory phase stability can no longer provide sufficient phase stability for light pulses in the visible optical range. Nevertheless, even in the IR-range phase stability is a significant technical problem, which can only be solved with considerable technical efforts, for example using an active phase stabilizing technique based on a control loop.

In 2004, optical spectroscopy has been further developed by Brixner et al. (T. Brixner, I. V. Stiopkin and G. R. Fleming, "Tunable two-dimensional femtosecond spectroscopy", Optics Letters 29, 884 (2004) and T. Brixner, T. Mancal, I. V. Stiopkin and G. R. Fleming, "Phase-stabilized two-dimensional electronic spectroscopy", Journal of Chemical Physics 121, 4221 (2004)) and Miller and al. (M. L. Cowan, J. P. Ogilvie and R. J. D. Miller, "Two-dimensional spectroscopy using diffractive optics based phased-locked photon echoes", Chemical Physics Letters 386, 184 (2004)), such that wavelengths in the visible spectrum could be used.

The setup used by Miller et al. employs diffractive optics, namely an optical grating having a small line density at which two incoming beams are split into a total of four beams, where two of the beams are phase-stable with respect to each other. Time delays are introduced using conventional delay lines and retro-reflectors, or alternatively using rotatable glass plates.

The setup of Brixner et al. corresponds to an apparatus according to the preamble of claim 1 and is schematically shown in FIG. 3. This setup too uses a diffractive optic. However, instead of conventional delay lines, pairs of movable glass wedges are used in order to precisely introduce delays. As can be seen in FIG. 3, two parallel partial beams generated via a beam splitter (not shown) are focused via a lens onto a grating ("diffractive optic"). Using the $+1^{st}$ and $-1^{st}$ order of diffraction of this grating four beams are generated, which are focused onto a sample using a spherical mirror (f=25 cm). Downstream of the sample, the three excitation pulses 1-3 are blocked using an aperture, and only the superposition of the third order signal and the local oscillator (i.e. the $4^{th}$ pulse) reaches the spectrometer.

Since all beams are guided along the same optical elements, this setup is inherently phase-stable. Time delays $\tau$ between the first and second light pulses and T between the second and third light pulses are introduced via the aforementioned path through the glass wedges, which can be shifted with respect to each other using stepper motors. This way, the optical wavelength of the individual beams can be varied extremely precisely and in a reproducible manner, such that a nominal precision of 2.7 attoseconds (as) can be obtained. As is demonstrated in the publications cited above, using this setup an excellent phase stability can be obtained even when pulses in the visible spectral range are used.

The main reason for the increased phase stability in this prior art has to do with the use of an optical grating for splitting the beams. Even when the optical grating moves due to unavoidable vibrations, no relative difference in the optical wavelength of the beams split at the grating occurs, so that the beams are inherently phase-stable. Accordingly, for the person skilled in the art of 2D spectroscopy, a passive phase stabilization is synonymous with the use of optical gratings.

Alternative active methods for obtaining a sufficient phase stability and for generating precise time delays between the pulses have been introduced by Nelson et al. (T. Hornung, J. C. Vaughan, T. Feurer and K. A. Nelson, "Degenerate four-wave mixing spectroscopy based on two-dimensional femtosecond pulse shaping", Optics Letters 29, 2052 (2004)) and by Damrauer and Zanni (E. M. Grumstrup, S.-H. Shim, M. A. Montgomery, N. H. Damrauer and M. T. Zanni, "Facile collection of two-dimensional electronic spectra using femtosecond pulse-shaping technology", Optics Express 15, 16681 (2007)). In these methods, an active phase modulator is employed in a suitable pulse former. However, such active phase modulator is rather costly, and the construction with finite size optical pixels limits the available time range for 2D spectroscopy.

Finally, according to Zhang et al., phase stability can also be achieved using an active control loop having a feedback mechanism (T. Zhang, C. N. Borca, X. Li and S. T. Cundiff, "Optical two-dimensional Fourier transform spectroscopy with active interferometric stabilization", Optics Express 13, 7432 (2005)). This requires an additional ongoing measurement of the relative phase positions and a closed loop trying to constantly correct the path lengths such that the measured phase remains constant. This technique is comparatively complicated, and there is a risk that the control loop introduces additional oscillations.

While the experimental setup of FIG. 3 has been generally successful, it would be advantageous to modify this setup such that it may find a broader use. The ultimate aim is that 2D spectroscopy (or the more-dimensional spectroscopy in a more general sense) can not only be carried out in specifically equipped laboratories by experts in the field of ultra fast spectroscopy, but to be generally employed in chemical or biological laboratories for determining the structure and dynamics of supramolecular compounds.

Additional related apparatuses are disclosed in US 2006 0063 188 A1 and WO 2007/064 830 A1.

SUMMARY OF THE INVENTION

It is an object of the present invention to provide an apparatus for coherent multi-dimensional optical spectroscopy according to the preamble of claim 1 which is simpler to use and structurally less complicated.

This object is achieved by an apparatus according to claim 1 and a method according to claim 19. Preferable embodiments are defined in the dependent claims.

According to the invention, the means for splitting the base light pulse into the first to fourth light pulses is a non-diffractive means, such as a metal thin film beam splitter, a dielectrically coated beam splitter, a polarization-dependent beam splitter, a prism beam splitter or a pellicle beam splitter. In other words, unlike the above-mentioned prior art, the base light pulse is split without using an optical grating.

In addition, according to the invention, the optical assembly is such that between entry of the base light pulse into the optical assembly and focusing the light pulses are guided pairwise at least on part of their paths, such that variations in the optical path lengths due to vibrations of the means for splitting the base pulse or due to an intentional variation using the delay means are at least to first order identical for pulses of a pair, wherein the pulse pairs are so chosen that the effects the change in arrival times of the pulses of a pair due to the variation in the optical path length have on the phase of the interference signal at least partially compensate each other.

The apparatus of the invention thus avoids an optical grating for splitting the base light pulses. This has a number of important advantages. First of all, the assembly becomes simpler and less costly, since suitable optical gratings are custom-made and only available at considerable expense with regard to time and money. Accordingly, the setup becomes less complicated.

In addition, when small bandwidth excitation pulses are used in prior art, it becomes necessary to provide different gratings for different excitation frequencies. However, the interchanging of gratings for specific applications is prohibitive in view of the envisaged general application in biology and chemistry, since the intended user would not be capable thereof. After exchanging the grating, the complete optical assembly has to be readjusted, which can only be carried out by an expert and even then takes considerable time. The apparatus of the invention, on the other hand, can be used for different frequencies without any changes to the apparatus, whereby the operation in practice becomes significantly easier.

In addition, by avoiding a diffractive optical element (i.e. an optical grating), the apparatus can also be used for shorter and larger bandwidth pulses than those that can for example be employed in the apparatus of FIG. 3. Namely, due to diffraction at the grating, the individual beams acquire a spatial chirp which for bandwidths of for example 200 nm in the visible spectrum is by no means negligible. This spreading causes a broad distribution of the incoming wave number vector ($\vec{k}$ vector), which in turn leads to a significantly enlarged opening angle of the signal and of course also leads to a spatial chirp in the signal. Accordingly, undesirable spatial effects occur when the signal is coupled in, and it can not be guaranteed that the complete system information is detected. This problem can be avoided when an optical grating is avoided, and for example ordinary beam splitters such as thin film beam splitters are used, so that the apparatus can be used with larger bandwidth pulses.

Along with the large spectral bandwidth of the light pulses, the number of systems that can be analysed in experiments increases significantly, since even very broad absorption spectra can be probed coherently. The method accordingly becomes applicable for diverse and complex analysis purposes, without having to be specifically adjusted to a specific application. First of all, this is an important step towards a broad and general application of the apparatus by users in chemistry and biology, who are not able to specifically adjust the apparatus for each specific analysis. Secondly, a larger spectral bandwidth allows to cover a plurality of energy levels simultaneously and therefore allows to acquire the information with regard to couplings in is complex systems with many single colour centres (chromophores), because couplings between frequencies far away from each other can be detected.

Accordingly, the setup of the apparatus avoiding an optical grating allows both, use of light pulses having different frequencies as well as use of light pulses having a larger bandwidth, which in turn significantly broadens the applicability of the apparatus.

As compared with the above-mentioned apparatuses comprising active phase stabilization techniques, the method of the invention is significantly simpler in construction and operation and is also more robust in operation.

Nevertheless, according to common wisdom in the field, optical gratings for splitting the beams are believed to be indispensable with regard to phase stability. Also, it is generally accepted in the field that in order to avoid artefacts in the measured spectra, an interferometric ultra precision of $\lambda/100$ is necessary, which corresponds to a time precision of 20 as at a wavelength of $\lambda=600$ nm. Such precision has indeed been achieved in the above-described prior art using optical gratings, and it is also true that this precision is not achievable using ordinary beam splitters.

However, the invention is based on the finding that when the light pulses are suitably guided in the optical assembly, such precision may become dispensable. As is explained in more detail below, a variation in the arrival time of each pulse at the sample site leads to a variation of the phase in the interference signal. This implies that the interference signal oscillates as a function of the individual delay times, and accordingly, even a small time shift of a light pulse, be it unintentional due to vibration of optical components or due to an intentional variation using the delay means, leads to a significant variation of the interference signal. This sensitivity is essentially the reason for the required high phase precision.

However, a closer analysis of the phase terms in the interference signal reveals that for specific pulse pairs, the effects of the variations of the arrival times of the pulses of the pair on the phase of the interference signal nearly compensate each other, if these variations are identical. Therefore, according to the invention, the light pulses are guided within the optical assembly in such pairs that the mutual variations in the optical path length for the pulses of such pair only leads to small variations of the phase of the interference signal, such that the phase sensitivity of the setup is dramatically reduced. It can be seen that the necessary precision in the arrival time of the light pulses is a few femtoseconds instead of 20 attoseconds, which means that the phase-stability requirements are made less severe by a factor of about 100.

In this regard, light pulses are also regarded as "guided pairwise" if they are not even split into individual light pulses yet. For example, if a light beam is split at a beam splitter into a first and a second light beam, in the framework of this disclosure, the first and second light beam would be considered to be "guided pairwise" even before this splitting occurs.

As will be explained in more detail with reference to an embodiment below, it is possible to shift the four light pulses in time with respect to each other and still guide all four light pulses on the entire light path within the optical assembly in pairs of pulses which phase-stabilize each other. The pairwise guiding of pulses has a two-fold effect with regard to the operation of the apparatus.

First of all, it ensures that the time variations of the pulses, which occur due to unavoidable vibrations of optical components such as beam splitters or bending mirrors, do not introduce undue phase variations in the interference signal. This is also the reason why in the framework of the invention the beams can be split using ordinary beam splitters and why an optical grating can be dispensed with. While the splitting using an optical grating is inherently phase-stable, a spatial translation (for example due to a vibration) of a beam splitter leads to a variation in the optical wavelength of the beam reflected at the beam splitter, which may indeed be proportional to the translational movement of the beam splitter, so that the optical wavelength changes in first order together with the translation of the beam splitter. However, this can be tolerated in the framework of the invention, since the light pulses are guided pairwise across the beam splitter in such a manner that variations in the optical path length of the pulses of a pair due to the vibration are at least to a first order identical, and because the pairs are so chosen that the effects the variations of the optical path lengths, i.e. the corresponding variations of the delay time, have on the phase of the interference signal at least partially (and in practice nearly completely) compensate each other.

The second effect relates to the pairwise guiding of the pulses by the delay means. Simply put, in the framework of the invention, it is ensured that pulses of a pair of mutually phase-stabilizing pulses are delayed by the same delay means, such that the requirements with regard to the precision of the adjustment of the delay means decrease just the same as those with regard to the stability of the other components. This means that the delay means need to be adjusted with significantly less precision compared to a case where light pulses are delayed individually and independently of each other, and this among others allows the use of ordinary delay lines instead of glass wedges as used in the setup of FIG. 3.

In a preferred embodiment, the optical assembly comprises a first beam splitter, which splits the base light pulse into a first partial beam and a second partial beam, a first delay means, which is arranged in the light path of the second partial beam, a second beam splitter splitting the first partial beam into a first and a second light beam and the second partial beam into a third and a fourth light beam, and a second delay means arranged in the light path of the first and third light beams. This is an extremely simple embodiment of the invention, which can be provided using ordinary components and is compatible with wide bandwidth light pulses, since it dispenses with diffractive beam splitters.

In this embodiment, the second partial beam is delayed using a first delay means before it is split at the second beam splitter into a third and a fourth light beam. In the terminology used in the present disclosure, the third and the fourth light beam will be considered to be "guided pairwise" in the first delay means, although at this time they are not separated from each other yet, but form a common light beam instead, namely the second partial beam. Using the two delay means, the arrival times of the four light pulses at the sample site can be varied with respect to each other in a suitable way, and this is possible although the light pulses are always delayed in pairs of pulses which are mutually phase-stabilizing.

In a preferred embodiment, the second partial beam is formed by the base pulse passing the first beam splitter, and the third light beam and the fourth light beam, which are generated from the second partial beam at the second beam splitter run in a first plane until reaching the focusing means. Further in this preferred embodiment, the first partial beam is formed by the part of the base beam which is reflected from the first beam splitter, and the first partial beam is reflected by a further mirror such that the first and the second light beam, which are generated at the second beam splitter from the first partial beam run in a second plane until reaching the focusing means. Herein, the first and second planes are preferably parallel to each other, and preferably, the two planes are horizontal planes.

This setup is extremely robust and compact and can be built up on an area of 60 cm×90 cm only without difficulty, where the light beams only travel about 1 m from the first beam splitter to the sample site. Such compact setup allows an apparatus which should find place in practically any physical, chemical or biological laboratory and can be stably operated.

In a preferred embodiment, the first beam splitter has a silver coating and the second beam splitter has a chrome coating. Depending on the polarization of the beams, a different combination can be useful, for example a chrome coating at the first beam splitter and a silver coating at the second beam splitter. This choice of the beam splitter is for example advantageous for applications in the visible spectral range. It is, however, explicitly emphasized that the apparatus of the invention can also provide a significant improvement over prior art for applications in the IR-regime and finds useful applications there. Namely, although the requirements on the phase stability are more easy to meet for the comparatively large IR wavelengths as compared to the visible or UV range, the problem of phase stability nevertheless exists even in the IR-regime, and some workgroups use active phase-stabilization techniques also in IR-2D spectroscopy to handle the problem. In this regard, the invention provides an extremely simple alternative. In a preferred embodiment, the first light beam corresponds to the above-mentioned first light pulse, the second light beams corresponds to the second light pulse, the third light beam corresponds to the third light pulse and the fourth light beam corresponds to the fourth light pulse.

In a preferred embodiment, the delay means comprises movable mirrors, the movement of which changes the path length of the light pulse deflected by the movable mirror between the light source and the sample site. Such delay means can for example be provided by an ordinary delay line employing two perpendicular mirrors. It is to be noted, however, that this per se simple solution is only possible due to the above-described pairwise guiding of the light pulses. For comparison, reference shall again be made to the setup of FIG. 3, in which movable glass wedges are used as delay means. Since light pulses in the setup of FIG. 3 are delayed individually, a very precise adjustment of the delay times was necessary in order to avoid a phase error in the interference signal, and the required precision can no longer be achieved with an ordinary delay line for the relevant wavelengths in the visible spectral range. If, however, such pairs of pulses are simultaneously delayed which mutually stabilize each other with regard to the phase of the interference signal, the precision of this ordinary delay line is completely sufficient for the integrity of the interference signal.

In fact, a delay line using movable mirrors is actually preferable over a delay means using variable glass paths, if light pulses with a large bandwidth shall be used. The inventors have systematically examined the influence of a glass path corresponding to a delay of 500 fs on the pulse length and pulse shape using the Sellmeyer equation. Even when using a low dispersive glass (Lithotech Fused Silica Q), it was observed that the duration of a pulse of 5.6 fs after passing the glass was increased to 9.8 fs (FWHM) or in other words, by 75%. This significantly decreases the peak intensity which only reaches 55% of the initial value after passing the glass. In addition, the higher order terms in the phase lead to a significantly changed pulse shape. The assumption of δ-like or even identical excitation pulses for all the points in time is therefore doubtful under these circumstances, so that the use of movable glass wedges becomes limited for large bandwidth excitations.

In a preferred embodiment, the movable mirrors of the first and/or second delay means are movable using a motor-driven or manually-driver mount and are additionally movable using piezoactuators. The movability of the mount allows comparatively large displacements, while the additional movability due to the piezoactuators allows for a fine tuning with high precision. In a preferred embodiment, only the first delay means comprises a motor-driven mount, while the second delay means only comprises a manually-movable mount, which allows to achieve the necessary displacements. Both delay means, however, comprise a piezoactuator.

In a preferred embodiment, the focusing means is formed by a spherical mirror and the optical assembly is configured such that the first to fourth light pulses impinge onto the spherical mirror along the edges of an imaginary cuboid. This geometry is also known as "box car" geometry. An aperture is preferably provided, which is configured such as to block the first to third light pulses after passing the sample and which passes the interference signal, i.e. the superposition of the third order signal with the fourth pulse (the local oscillator).

Downstream of the aperture, a lens assembly, for example a microscope objective is preferably disposed, which is adapted to receive the interference signal and coupled into a single-mode fibre.

In addition, at least one shutter mechanism is preferably provided which allows to selectively block the first, the second, the third and/or the fourth light pulse. This shutter mechanism can be used to measure stray terms with which the experimentally-obtained signal can later be corrected.

Preferably, the detection means comprises a spectrometer configured to measure the interference signal in frequency space.

In a preferred embodiment, an additional delay means is provided in the light path of the fourth pulse. This delay means can for example be adjusted manually such as to delay the fourth light pulse with respect to the first to third light pulses, in order to obtain a setup in which the fourth light pulse, which provides the local oscillator for the heterodyne detection, arrives last among the four pulses at the sample site. Accordingly, this additional delay means serves to delay a single light pulse, not a pulse pair, such that the phase-stabilizing effect described above does not apply for this delay means. However, this delay means is not moved during the measurement but only serves to introduce a global delay of the fourth light pulse. In an alternative embodiment, the light pulses 1-3 are delayed with regard to the fourth light pulse using a further delay element, such that the fourth light pulse arrives at the sample site first.

In an advantageous embodiment, the optical assembly is disposed in a housing, for example an acrylic glass housing. Within the housing, a stable air flow and temperature environment can be established, such that an operation which is stable in time can be achieved.

In a preferred embodiment, the apparatus comprises a light source for generating the base pulse. Preferably, the light source comprises a non-collinear optical-parametric amplifier. Preferably, the light source is configured to generate pulses having a relative bandwidth $\Delta\lambda/\lambda$ of at least 0.2, preferably at least 0.3, where $\Delta\lambda$ is the width FWHM of the wavelength spectrum and $\lambda$ is the centre frequency of the pulse.

BRIEF DESCRIPTION OF THE DRAWINGS

Further advantages and features of the present invention become apparent from the following description, in which the invention is illustrated with reference to an exemplary embodiment and referring to the accompanying drawings. Therein.

DETAILED DESCRIPTION

I. Structure of the Apparatus

Figure 4:
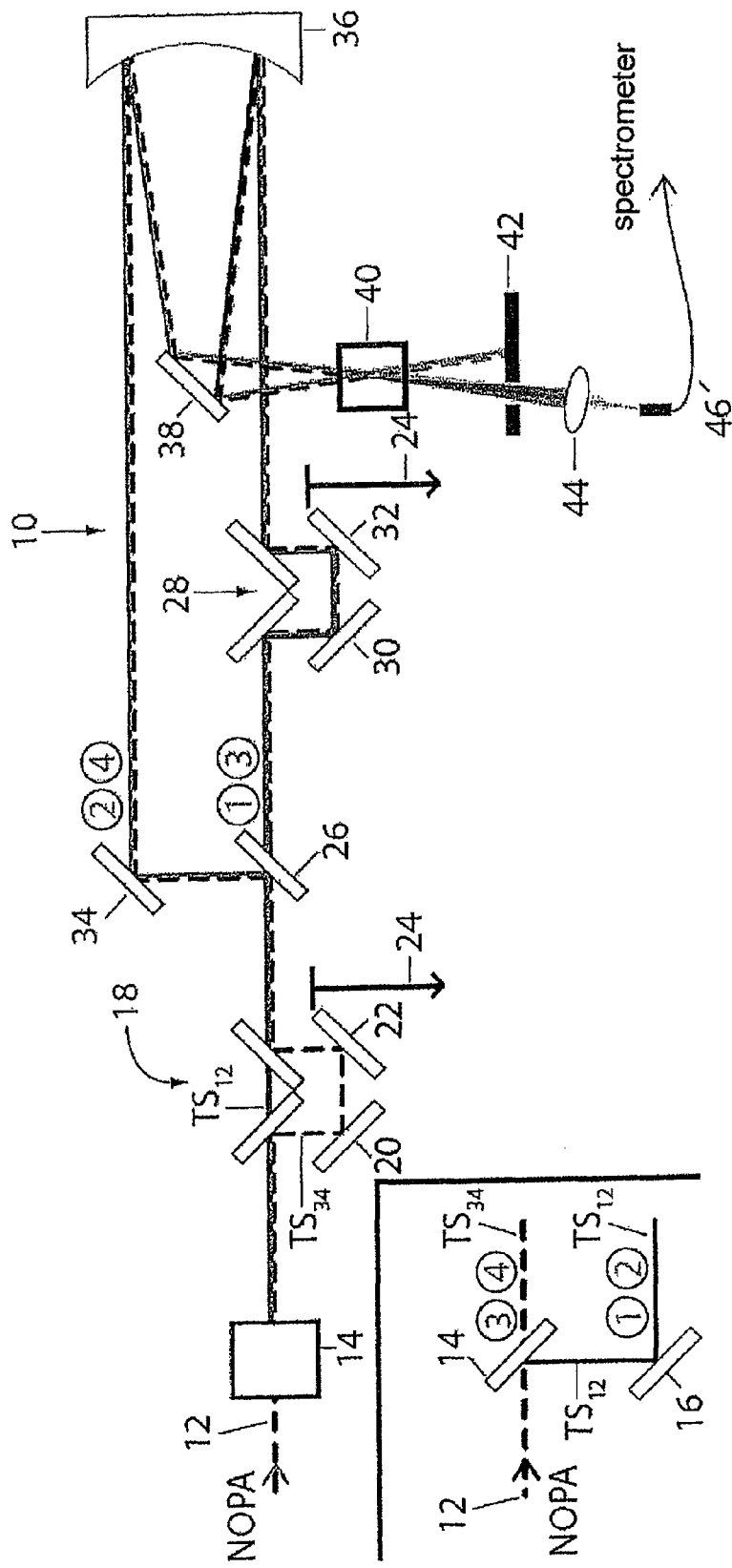
FIG. 4 shows the setup of an apparatus for two-dimensional optical spectroscopy according to an embodiment of the invention.

FIG. 4 is a schematic top view of an apparatus 10 for coherent two-dimensional optical spectroscopy according to an embodiment of the invention. As a large bandwidth coherent light source, in the apparatus 10 of FIG. 4 a so-called non-collinear optical-parametric amplifier, (NOPA) is used, which is not shown in FIG. 4. A base light pulse 12 leaves the NOPA and is split at a first beam splitter 14 into a first partial beam $TS_{12}$ and a second partial beam $TS_{34}$. In the exemplary embodiment shown, the base light pulse is a large bandwidth pulse having a width of 200 nm or more. As is shown in the insert figure of FIG. 4 (side view), the second partial beam $TS_{34}$ is formed by that part of the base pulse 12 which passes the first beam splitter 14 and thus runs in the drawing plane of FIG. 4. The first partial beam $TS_{12}$, on the other hand, is deflected into the paper plane at beam splitter 14 and is deflected by a mirror 16 into a plane which is parallel to and below the paper plane of FIG. 4.

As can be seen in the side view insert of FIG. 4, the first partial beam $TS_{12}$ is a partial beam, from which the first and the second light pulse are eventually generated, and the second partial beam $TS_{34}$ is a beam, from which the third and the fourth light pulse are eventually generated.

Downstream of the beam splitter 14, a first variable delay line 18 is provided which comprises two perpendicularly oriented mirrors 20 mounted on a motor-driven movable mount (not shown). An additional piezoactuator is provided between the mount (not shown) and mirrors 20, 22. By means of the movable mount (not shown) and the piezoactuator (not shown), the mirrors 20 and 22 can be displaced in a direction which is illustrated in FIG. 4 by an arrow 24. The movable mount (not shown) which can for example be a displacement table manufactured by "Newport", allows a displacement along comparatively large displacement paths. The additional pizeoactuator (not shown) allows for a precise control of the delay times with a reproducible adjustment precision of better than 0.2 fs.

The delay line 18 is only disposed in the light path of partial beam $TS_{34}$, while partial beam is $TS_{12}$ runs without delay underneath delay line 18.

Thereafter, the first partial beam $TS_{12}$ and the second partial beam $TS_{34}$ meet a second beam splitter 26. In the paper plane of FIG. 4, which is referred to as the "second horizontal plane" in the following, the beam splitter 26 splits the second partial beam $TS_{34}$ in a third light pulse which passes through the second beam splitter 26 and a fourth light pulse which is reflected by the second beam splitter 26. In the plane below the paper plane, referred to as the "first horizontal plane" in the following, the second beam splitter 26 splits the first partial beam $TS_{12}$ into a first light pulse, which passes the second beam splitter 26 and a second light pulse, which is reflected off the second beam splitter 26.

The first and third light pulses are guided through a second variable delay line 28 which also comprises two perpendicular mirrors 30, 32 and which is generally similar to the first variable delay line 18, except that in the second variable delay line 28, in addition to the piezoactuator (not shown) only a manually-movable mount is provided. The reason is that for the range of delays that are to be generated with the second variable delay line 28, the displacement capability of the piezoactuator is already sufficient. The second and fourth light pulses are reflected at a mirror 34.

The first to fourth light pulses impinge on a spherical focusing mirror 36 having a focal length of 25 cm along the edges of an imaginary cuboid, wherein the first and the second light pulse run in the first horizontal plane, i.e. below the paper plane of FIG. 4, and the third and fourth light pulses run in the second horizontal plane, i.e. in the paper plane of FIG. 4. This geometry is also known as the "box car geometry".

The first to fourth light beams are focused by spherical mirror 36 via a further mirror 38 onto a sample 40. Herein, a third order signal is generated by interaction of the first to third light pulses with the sample 40. The signal wave vector $\vec{k}_s$ obeys the phase adaption condition $\vec{k}_s = -\vec{k}_1 + \vec{k}_2 + \vec{k}_3$, wherein $\vec{k}_1$, $\vec{k}_2$ and $\vec{k}_3$ are the wave vectors of the first to third light pulses. The wave vector $\vec{k}_s$ of the third order signal has the same direction as the wave vector $\vec{k}_4$ of the fourth light pulse, which serves as a local oscillator (LO). The third order signal and the fourth light pulse therefore propagate in the same direction and can interfere with each other.

Figure 5:
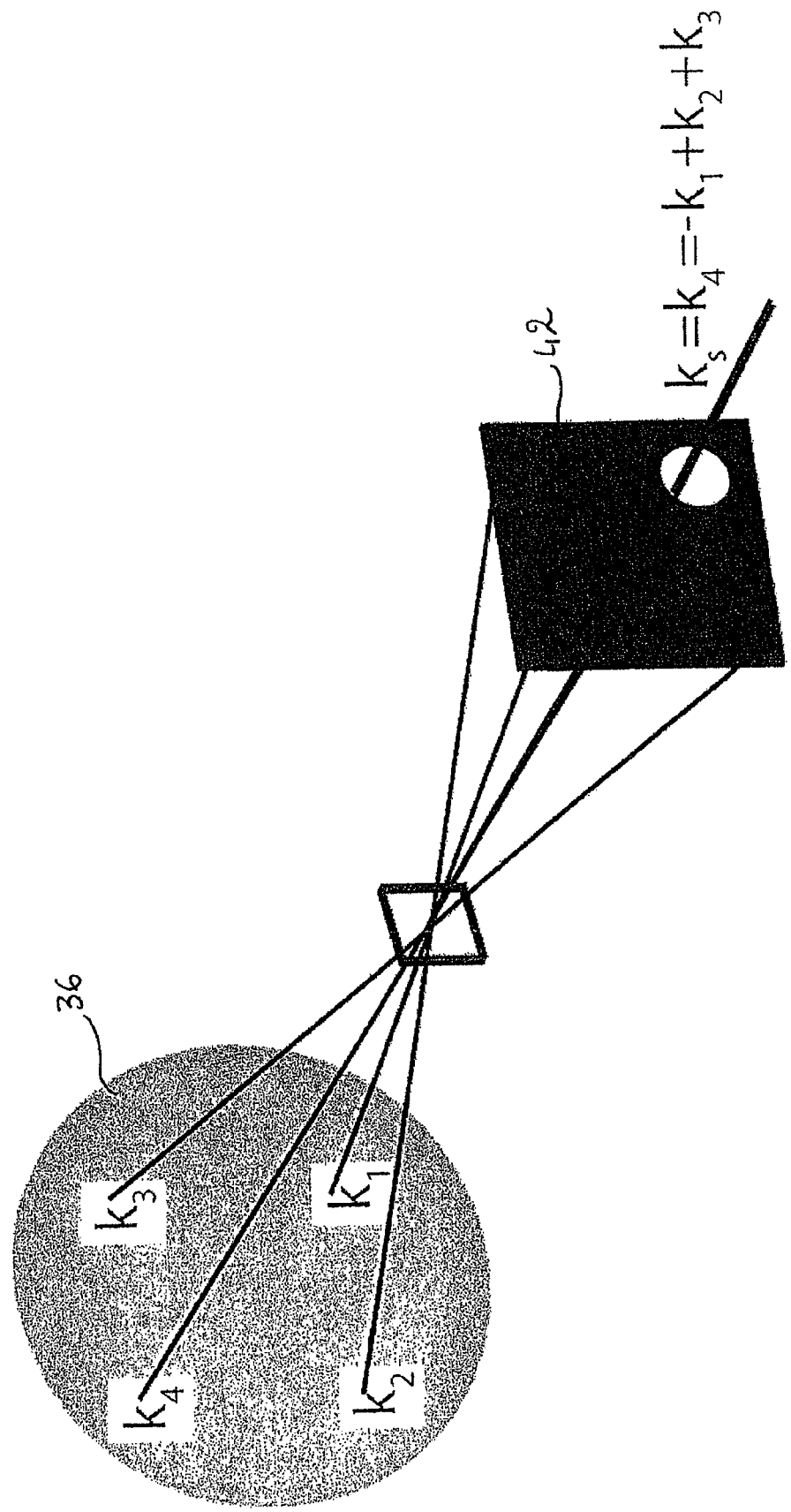
FIG. 5 shows a perspective view of a spherical mirror, a sample and an aperture as used in the apparatus of FIG. 4.

An aperture 42 is provided which only passes the fourth light pulse and the third order signal, while it blocks light pulses 1 to 3. The geometrical relationship between the spherical mirror 36, the sample 14 and the aperture 42 is illustrated in a perspective view of FIG. 5.

Downstream of the aperture 42 a microscope objective 44 is disposed which couples the third order signal and the LO, i.e. the fourth light pulse into a single-mode fibre 46 for heterodyne detection. The third order signal and the fourth light pulse are carried along the single-mode fibre 46 into a spectrometer (not shown).

The apparatus 10 further comprises shutter mechanisms (not shown in FIG. 4) by which the four light pulses can be independently blocked in order to measure stray light of the individual beams or arbitrary combinations of beams in an automatic manner and which are to be numerically removed later in the data analysis. In addition, a variable attenuator (not shown) is disposed in the light path of the fourth light pulse, and a glass plate (not shown) is provided in front of sample 40, which can be tilted in order to establish a temporal and spatial shift between the fourth light pulse (i.e. the LO) and the first to third light pulses.

The setup schematically shown in FIG. 4 can be put to practice in an extremely compact and flat configuration. In an actual embodiment, the height of the beams of the upper beam pair is 9 cm and that of the lower beam pair is 6 cm. The whole setup can be accommodated on a 60 cm×90 cm bread board. From the first beam splitter 14 up to the sample 40, the light pulses travel a distance of 105 cm only. In order to minimize the influence of air flows and short-termed temperature variations, the complete setup is preferably arranged in a housing, for example an acrylic glass housing (not shown).

II. Function of the Apparatus

In the following, the function of the apparatus according to an exemplary embodiment of the invention as shown in FIG. 4 will be described. In order to understand the function of the apparatus of FIG. 4, a short explanation of 2D spectroscopy is necessary before the special features of the setup of FIG. 4 can be more closely explained.

For 2D spectroscopy employing three excitation pulses, the third order polarization is relevant:

$$P^{(3)}(\vec{r},t) = \int_0^\infty dt_3 \int_0^\infty dt_2 \ldots \int_0^\infty dt_1 S^{(3)}(t_3,t_2,t_1) \times \quad (1)$$
$$E(\vec{r}, t-t_3)E(\vec{r}, t-t_3-t_2)E(\vec{r}, t-t_3-t_2-t_1).$$

Herein, $\vec{r}$ represents the position, t the time, E the electrical field and $S^{(3)}$ the third order spectral response function. The general idea of the 2D experiment is as follows: By systematically varying the interaction times $t-t_3$, $t-t_3-t_2$ and $t-t_3-t_2-t_1$, the time dependency of polarization $P^{(3)}$ can be completely determined, and one may obtain the complete microscopic information about the system which is contained in the third order of the quantum mechanical density operator as a function of the electrical field. Since the excitation laser pulses always have a finite duration, the interaction time with the matter can be limited to the envelope of the pulse. Thus, experimentally only the times of the pulse centres are actually varied, namely by a suitable variation of the delay lines 18 and 28 of FIG. 4.

The electrical probe field E is ideally comprised of three identical pulses having a complex amplitude $\tilde{A}(t) = A(t)e^{i\Phi(t)}$ and a center frequency $\omega_0$, which in time-space are centered about points $\tilde{t}_1$, $\tilde{t}_2$ and $\tilde{t}_3$:

$$E(t) = \tilde{A}(t-\tilde{t}_1)e^{(-i\omega_0(t-\tilde{t}_1)+\vec{k}_1\vec{r})} + \quad (2)$$
$$\tilde{A}(t-\tilde{t}_2)e^{(-i\omega_0(t-\tilde{t}_2)+\vec{k}_2\vec{r})} + \tilde{A}(t-\tilde{t}_3)e^{(-i\omega_0(t-\tilde{t}_3)+\vec{k}_3\vec{r})} + c.c \ldots$$

Figure 6:
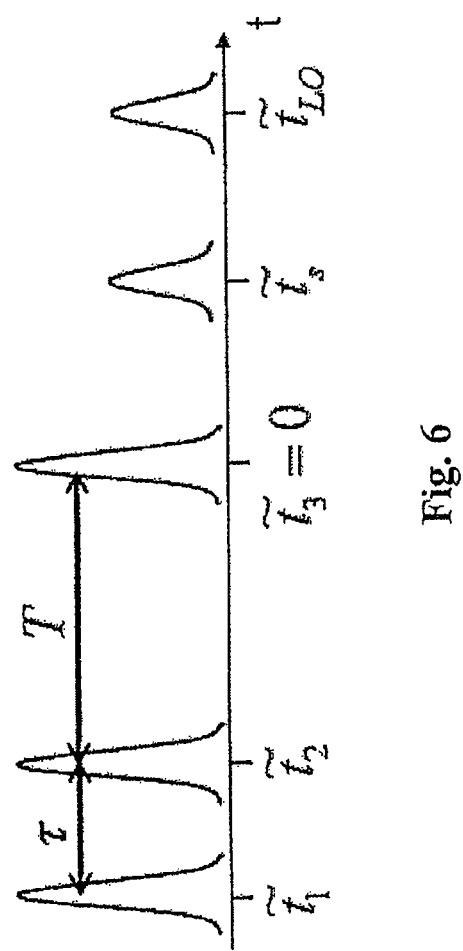
FIG. 6 shows a diagram illustrating the timing of pulses 1-4 as well as of the signal pulse.

The sequence of the three pulses is illustrated in FIG. 6. The center of mass of the third pulse $\tilde{t}_3=0$ is chosen as time zero. The temporal distance between the first two pulses is referred to as coherence time $\tau$, $\tau=\tilde{t}_2-\tilde{t}_1$, since during this time, the quantum mechanical system is in the off-diagonal state of the density operator, i.e. in the so-called "coherence". The time interval between the second and third pulses is referred to as population time T, since at this time the system is again in a diagonal state of the density operator, which is also referred to as "population". Hence, for the pulse sequence shown in FIG. 6, the following condition applies: $T=\tilde{t}_3-\tilde{t}_2=-\tilde{t}_2$.

Substituting the electrical field of equation (2) in equation (1) will lead to 6×6×6=216 terms due to the multiplication of three E-fields, $E(\vec{r}, t-t_3)E(\vec{r}, t-t_3-t_2)E(\vec{r}, t-t_3-t_2-t_1)$ and the six summands in equation (2.16). Each of these 216 terms consist of three amplitude functions $A(t)$ or $A^*(t)$ and the corresponding phase factors, which determine its direction and frequency. For example, the contribution $$A(t-\tilde{t}_2-t_3-t_2-t_1)A^*(t-\tilde{t}_1-t_3-t_2)A(t-\tilde{t}_3-t_3)$$

$$e^{-i\omega_0(t-\tilde{t}_2-t_3-t_2-t_1)}e^{i\omega_0(t-\tilde{t}_1-t_3-t_2)}e^{-i\omega_0(t-\tilde{t}_3-t_3)}e^{i(\vec{k}_2-\vec{k}_1+\vec{k}_3)\vec{r}} \quad (3)$$

corresponds to the situation that the system first interacts at time $t-t_3-t_2-t_1$ with the pulse in direction $\vec{k}_2$, then interacts at $t-t_3-t_2$ with the pulse in direction $\vec{k}_1$ and finally interacts at $t-t_3$ with the pulse in direction $\vec{k}_3$. Multiple interactions with the pulse in direction $\vec{k}_1$ are not excluded yet. The number of terms contributing to the measured signal will however be extremely reduced due to the special "box car geometry" of the experiment, which has been discussed in connection with FIG. 5. Since detection is only made in the direction $-\vec{k}_1 + \vec{k}_2 + \vec{k}_3$, six of the 216 terms are selected. Irrespectively of the specific time order, there is a common phase factor $$e^{i\omega_0(t+\tilde{t}_1-\tilde{t}_2-\tilde{t}_3)} = e^{i\omega_0 t + i\omega_0 \tau}$$

in each of the six contributions. The phase factor is independent of the time variables $t_i$ and accordingly can be taken out of the integral. In addition, each term comprises one of the following phase factors:

$$e^{i\omega_0(t_3+t_1)},$$

$$e^{i\omega_0(t_3-t_1)},$$

$$e^{i\omega_0(t_1+2t_2+t_3)}. \quad (4)$$

A further simplification is achieved using the so-called rotating wave approximation (RWA). The RWA is based on the consideration that in addition to the above phase factors of the electrical excitation field, phase factors of the response function, that is of the system properties, will also contribute to the polarization. For computing the polarization, in the RWA only those terms are considered which oscillate slowly. These terms arise, because the excitation laser frequency is close to the resonance of electronical transitions of the system and the combination of both phase factors with opposite sign then nearly cancel each other. Rapidly oscillating contributions, on the other hand, which correspond to the addition of these phases will contribute much less to the integral and are therefore disregarded. Under this assumption, the third order polarization $P^{(3)}(\tau,T,t)$ can be represented as follows:

$$P^{(3)}(\tau, T, t) = \quad (5)$$

$$e^{-i\omega_0 t + i\omega_0 \tau} \int_0^\infty dt_3 \int_0^\infty dt_2 \ldots \int_0^\infty dt_1 \{S^{(3)}_{R,rw}(t_3, t_2, t_1) e^{i\omega_0(t_3-t_1)}$$

$$[A^*(t-\tilde{t}_1-t_3-t_2-t_1)A(t-\tilde{t}_2-t_3-t_2)A$$

$$(t-\tilde{t}_3-t_3)+A^*(t-\tilde{t}_1-t_3-t_2-t_1)$$

$$A(t-\tilde{t}_3-t_3-t_2)A(t-\tilde{t}_2-t_3)]+$$

$$S^{(3)}_{NR,rw}(t_3, t_2, t_1) e^{i\omega_0(t_1+t_3)}$$

$$[A(t-\tilde{t}_2-t_3-t_2-t_1)A^*(t-\tilde{t}_1-t_3-t_2)A$$

$$(t-\tilde{t}_3-t_3)+A(t-\tilde{t}_3-t_3-t_2-t_1)$$

$$A^*(t-\tilde{t}_1-t_3-t_2)A(t-\tilde{t}_2-t_3)]+$$

$$S^{(3)}_{DC,rw}(t_3, t_2, t_1) e^{i\omega_0(t_1+2t_2+t_3)}$$

$$[A(t-\tilde{t}_2-t_3-t_2-t_1)A(t-\tilde{t}_3-t_3-t_2)A^*$$

$$(t-\tilde{t}_1-t_3)+A(t-\tilde{t}_3-t_3-t_2-t_1)$$

$$A(t-\tilde{t}_2-t_3-t_2)A^*(t-\tilde{t}_1-t_3)]\}.$$

Herein the terms have been sorted according to the phase factors of the E-field and response functions $S_{i,rw}^{(3)}$ have been defined, which correspond to sums over so-called Liouville paths. Consequently, the contributions can now further be classified according to characteristic series expansions of the density operator in so-called Liouville paths: the term with the phase factor $e^{i\omega_0(t_2-t_1)}$ obviously corresponds to the case that the phase acquired during the coherence time $t$/is exactly the conjugated of the phase acquired during the detection time $t_3$. This is also referred to as rephasing paths in Liouville space, and the signal associated therewith is referred to as echo. For the two other phase factors, no microscopic rephasing is possible. A further explanation can be found in the articles of M. Khalil, N. Demirdoven and A. Tokmakoff, Coherent 2D IR spectroscopy: Molecular structure and dynamics in solution, *JOURNAL OF PHYSICAL CHEMISTRY A*, 107:5258-5279, July 2003 and in the article of J. D. Hybl, A. A. Ferro and D. M. Jonas, Two-dimensional fourier transform electronic spectroscopy, *JOURNAL OF CHEMICAL PHYSICS*; 115.6622, 2001.

Figure 1:
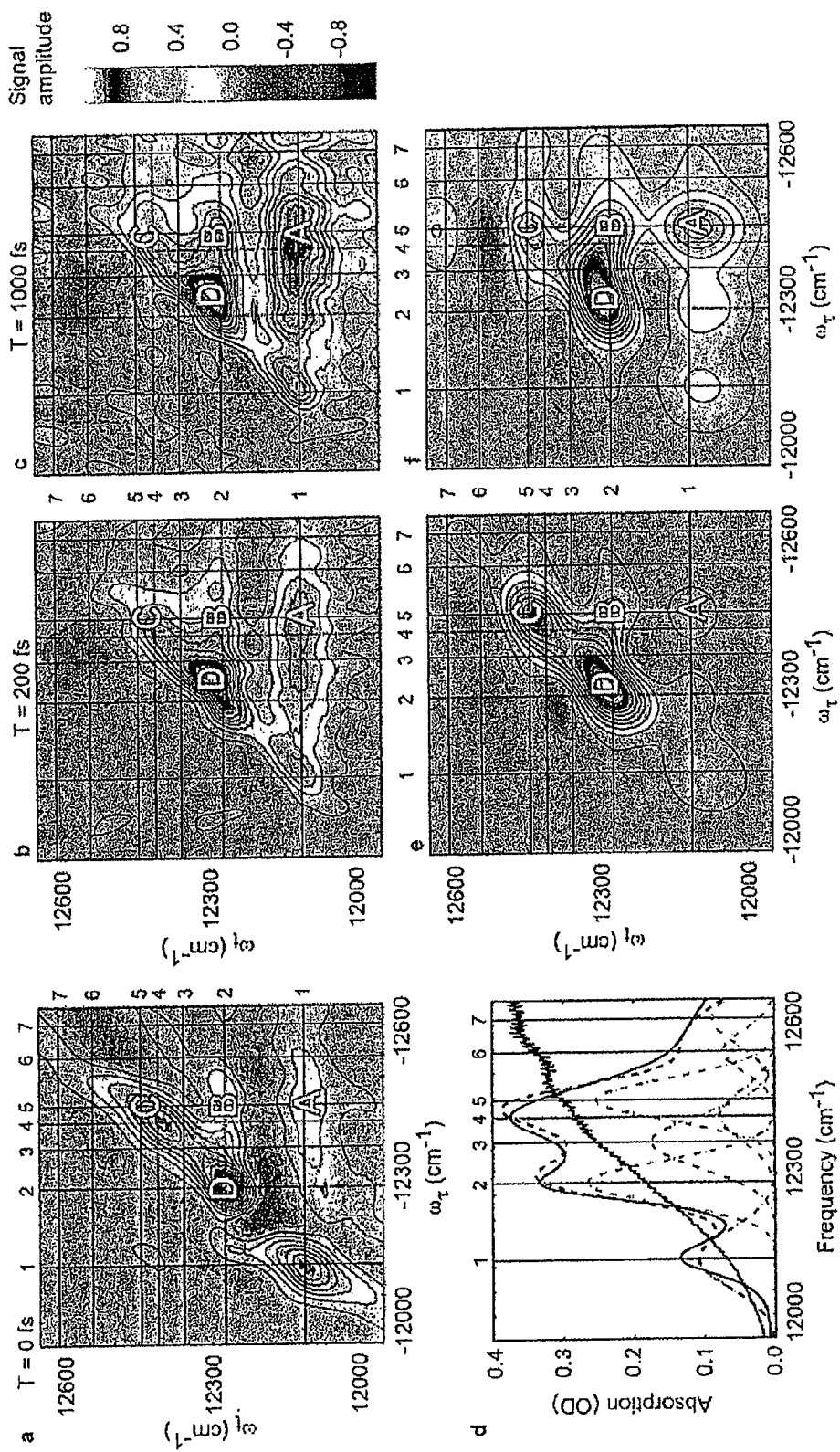
FIG. 1 shows a plurality of 2D spectra which have been recorded with the prior art apparatus of FIG. 3, FIG. 2 schematically shows the setup of an apparatus for coherent two-dimensional optical spectroscopy in the IR spectral range according to Tokmakoff et al., FIG. 3 schematically shows the setup of an apparatus for coherent two-dimensional optical spectroscopy in the visual spectral range according to Brixner et al.

The translation between the polarization $P^{(3)}(\tau,T,t)$ and the 2D spectra with two intuitive frequency axes as shown in FIG. 1 is obtained via a two-dimensional Fourier transformation with regard to the two time axes $\tau$ and $t$. In the setup of FIG. 4, only the electrical fields of the signal $E_S$ is experimentally accessible, which is also not measured as a function of detection time $t$, but is measured with a spectrometer as a function of the frequency $\omega_t$ conjugated to $t$. The relationship between $E_S$ and the polarization is as follows:

$$E_S(\tau, T, \omega_t) \propto \frac{i\omega_t}{n(\omega_t)} P^{(3)}(\tau, T, \omega).$$

Advantageously, one of the two Fourier transformations is already implicitly comprised in the detection method, and the following relationship remains:

$$S_{2D}(\omega_\tau, T, \omega_t) = \int_{-\infty}^\infty d\tau P^{(3)}(\tau, T, \omega_t) e^{i\omega_\tau \tau} \quad (6)$$

$$= \int_{-\infty}^\infty d\tau \frac{E_S(\tau, T, \omega_t) n(\omega_t)}{\omega_t} e^{i\omega_\tau \tau}.$$

Equation (6) thus defines the actual 2D spectrum as shown in FIG. 1, which is a function of the two frequencies $\omega_\tau$, $\omega_t$ (and is therefore 2-dimensional), and which is further a function of population time T. The resulting spectra are complex-valued and can be represented as real and imaginary part or as absolute value and phase. The absolute phase of the 2D spectrum can be determined for each population time by comparison with a pump-probe measurement. The projection of the 2D spectrum onto the $\omega_\tau$ axis must coincide with the pump-probe spectrum, if the absolute phase is correctly chosen.

As can be seen from equation (5), for calculating a 2D spectrum, the detection of the complete electrical field $E_S$ of the signal, i.e. the signal amplitude and the signal phase is necessary. The detection of the signal amplitude and the phase of the signal $E_S$ is achieved via spectral interferometry, which is also referred to as heterodyne detection. Therein, a third order signal pulse is superposed with a completely known reference pulse, namely the fourth light pulse, with a time delay $t_4$, and the interference of these two pulses is recorded in frequency space as an interference signal with a spectrometer. Due to its function as a reference pulse, the fourth light pulse is therefore also referred to as a "local oscillator" (LO). For the intensity $I_{SI}(\omega_t)$ detected with the spectrometer (not shown in FIG. 4), the following equation applies:

$$I_{SI}(\omega_t)=|E_s(\omega_t)e^{i\phi S(\omega t)}+E_{LO}(\omega_t)e^{i\phi LO(\omega t)}e^{i\omega_t t_4}|^2. \quad (7)$$

Since no confusion between time intervals and points in time exists anymore, points of time are no longer designated with a tilde. In equation (7) above, $E_{SI}$ and $E_{LO}$ refer to the amplitude of the electrical field of the third order signal and of the local oscillator (i.e. the fourth light pulse), respectively, and $\phi_S$ and $\phi_{LO}$ refer to the corresponding phases.

The amplitude $E_S$ and the phase $\phi_S$ can be extracted from the measured SI spectrum of equation (7) in a known manner, as will be explained with reference to FIG. 7. Starting point is the SI spectrum according to equation (7) measured with the spectrometer, which is shown in the top left part of FIG. 7. The inverse Fourier transformation ("invers", since from frequency space to time space) yields three peaks which are shown in the lower left part of FIG. 7. The large peak in the middle is centered at t=0 and corresponds the inverse Fourier transform of the single spectra of the third order signal and the LO. The two peaks at $\phi t_0$ and $t_0$ correspond to the inverse Fourier transforms of the interference signals, where $\Delta\phi$ corresponds to the phase difference $\phi_S-\phi_{LO}$, $I_S$ and $I_{LO}$ correspond to the intensities of the third order signal and the LO pulse, respectively. In order to obtain this signal field, a filter is used which cuts out only the peak at $t=+t_0$ from the inverse Fourier transform, as is shown in the bottom right part of FIG. 7. The Fourier transform of this peak then provides a signal 2 $\sqrt{I_S I_{LO}}e^{i\Delta\phi}$, from which the amplitude $\vec{\sqrt{I_S}}$ and the phase $\phi_S$ can be determined, since the amplitude $\vec{\sqrt{I_{LO}}}$ and the phase $\phi_{LO}$ of the local oscillator are known.

is In the following, the problem of phase stability with regard to changes in the optical path length of the individual light pulses is analysed. Consider that the times $t_i$ of the light pulses change due to a variation of the optical wavelength by a value of $\Delta t_i$ each. If a variation $\Delta t_i$ is added to each time $t_i$, the frequency signal $I_{SI}$ of equation (7) changes as follows:

$$I_{SI}(\omega_t)=|E_S(\omega_t)e^{i\phi S(\omega_t)}e^{i\omega_0(-\Delta t_1+\Delta t_2+\Delta t_3)}+E_{LO}(\omega_t)e^{i\phi LO}(\omega_t)e^{i\omega_t t_4}e^{i\omega_0 \Delta t_4}|^2. \quad (8)$$

As can be seen from equation (8), the phase in the expression of the interference signal changes directly with a change of $\Delta t_i$ for i=1 to 4. This means that due to a variation of one of the times, the interference pattern in the SI spectrum, the so-called "fringes" shown in the upper left part of FIG. 7 are shifted. From the shape of the SI spectrum, it is obvious that a small shift already leads to a significant change in the intensity for a given frequency. This is the reason why the interference signal is generally extremely phase-sensitive, and this is also the reason for the high standard required for the phase-stability and phase precision of the experimental setups mentioned above. However, one can see in equation (8) that the contribution of the absolute phase difference largely vanishes if the following equation is met:

$$-\Delta t_1+\Delta t_2+\Delta t_3-\Delta t_4=0.$$

This in turn is met if the individual pulses undergo a pairwise identical phase shift according to $t_1 \rightarrow t_1+\Delta_{12}$ $t_2 \rightarrow t_2+\Delta_{12}$ $t_3 \rightarrow t_3+\Delta_{34}$ $t_4 \rightarrow t_4+\Delta_{34}$ or $t_1 \rightarrow t_1+\Delta_{13}$ $t_2 \rightarrow t_2+\Delta_{24}$ $t_3 \rightarrow t_3+\Delta_{13}$ $t_4 \rightarrow t_4+\Delta_{24}.$ Since the main cause for the phase shift are vibrations of individual reflective elements in the setup, the absolute part of the phase can be stabilized, as long as beams are guided in suitable pairs along or across these elements.

Precisely this kind of pairwise guiding is done in the setup of FIG. 4 Obviously, a pairwise variation of the optical path lengths has no significant influence on the phase of the interference signal for the following pulse pairs: Pulse 1/Pulse 2, Pulse 3/Pulse 4, Pulse 1/Pulse 3 and Pulse 2/Pulse 4. As can be seen from FIG. 4, in the apparatus 10, only those pulse pairs are commonly guided or directed across beam splitters 14, 26, mirrors 16, 34, 36, 38 and delay is lines 18 and 28. Each of these optical elements can have an influence on the optical wavelength, be it unintentionally, in case of beam splitters 14, 26 and mirrors 16, 34, 36 and 38 or be it intentionally in case of delay lines 18 and 28. However, in this case the optical wavelengths of both pulses of the above-mentioned pulse pairs change at least to first order in the same way such that the variations in their arrival times caused thereby are identical to first order. Since these variations generally cancel each other with regard to the phase of the interference signal, the phase is comparatively stable with regard to these variations. This allows to provide the setup of FIG. 4 with optical standard components, and in particular, without the use of gratings or variable path lengths in glass, which as explained above are disadvantageous with regard to larger bandwidths of the light pulses.

Figure 9:
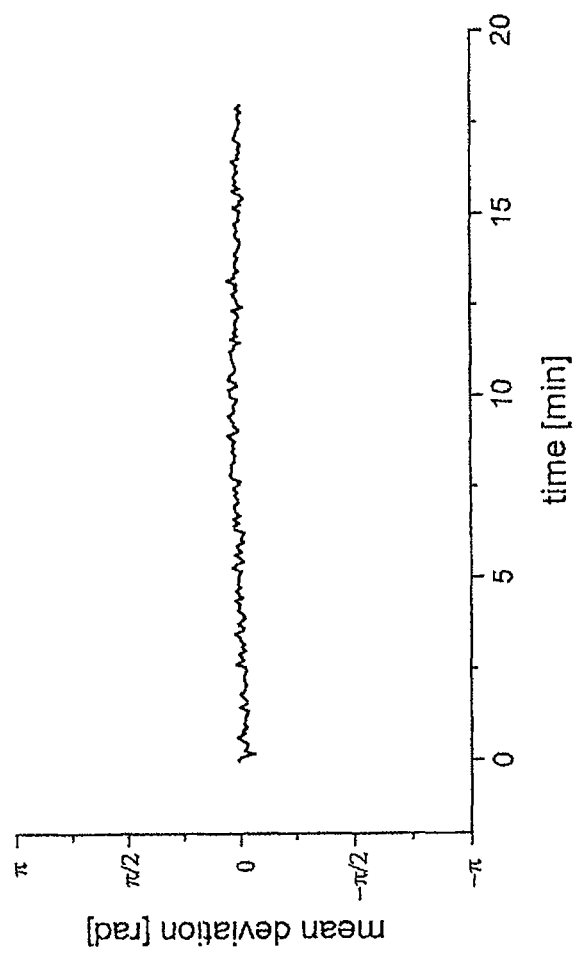
FIG. 9 shows a diagram displaying the spectral phase of the signal relative to the local oscillator for a duration of 18 minutes.

FIG. 9 is a diagram demonstrating the successful stabilizing of the phase using the setup of FIG. 4. In the experiment, the spectral interference of the third order signal with the local oscillator has been recorded for an extended period of time, while the three other pulses overlapped in time. Using a Fourier analysis, the spectral phase of the signals relative to the LO has been obtained. The result of an 18 minute-long measurement is shown in FIG. 9. The maximum deviation in phase amounts to $\pi/20$. This interferometric precision goes back to the principle of the pairwise guiding of the beams introduced herein and allows a phase stability in 2D spectroscopy in the visible range without using diffractive or active elements. In a conventional setup without the pairwise guiding of the beams, the phase would typically differ significantly from zero after a few seconds and would fluctuate or drift between $-\pi$ and $+\pi$ in the course of the full interval.

III. The Measuring Method

In the following, the measuring method employing the apparatus of FIG. 4 will be explained. In a first step, the laser pulse of the NOPA is brought to the desired spectral shape, time-compressed and characterized in intensity and phase through a FROG measurement (transient grating frequencyresolved optical gating). The setup of FIG. 4 comprises in a preferable embodiment two apertures (not shown) by means of which through a simple coupling of the visible NOPA beam the parallelity of the beams with respect to each other and the overlap of the four beams at the sample site is ensured.

Next, the precise zero time is determined using spectral interferometry at the sample site using a single-mode fibre. For this purpose, the piezoactuators are moved to the centre of their displacement range, and the first and second delay lines 18, 28 are positioned according to the best possible overlap of two of the beams (beams 1 and 2 for τ=0, beams 2 and 3 for T=0) using the motor or the micrometer screw, respectively. In addition, the arrival time of the local oscillator $t_{LO}$ is determined using spectral interferometry. Then, the sample is placed in the overlapping region of the beams.

At T=τ=0, a visible third order signal is generated, which propagates in the direction of the fourth light pulse, i.e. the LO. The third order signal and the LO are coupled into the spectrometer using the microscope objective 44 and the single-mode fibre 46. In a next step, the size of the stray terms, i.e. contributions to the signal which are only due to two or one beam, are determined using the above-mentioned shutter mechanisms (in FIG. 4 not shown).

Then the actual measurement can be performed in an automated way using a computer prow gram. For each data point, several steps are carried out:

The delay times τ and T are adjusted by suitable adjustments of the delay lines 18 and 28. The spectral interference of the signal and the LO is recorded by the spectrometer. In addition, depending on necessity and signal quality, the aforementioned stray terms can be recorded for a later numerical correction of the data. For this purpose, the above-mentioned shutter mechanisms are also automatically set to the necessary combinations of open and close. An arbitrary number of 2D spectra can be measured at different population times T.

Figure 7:
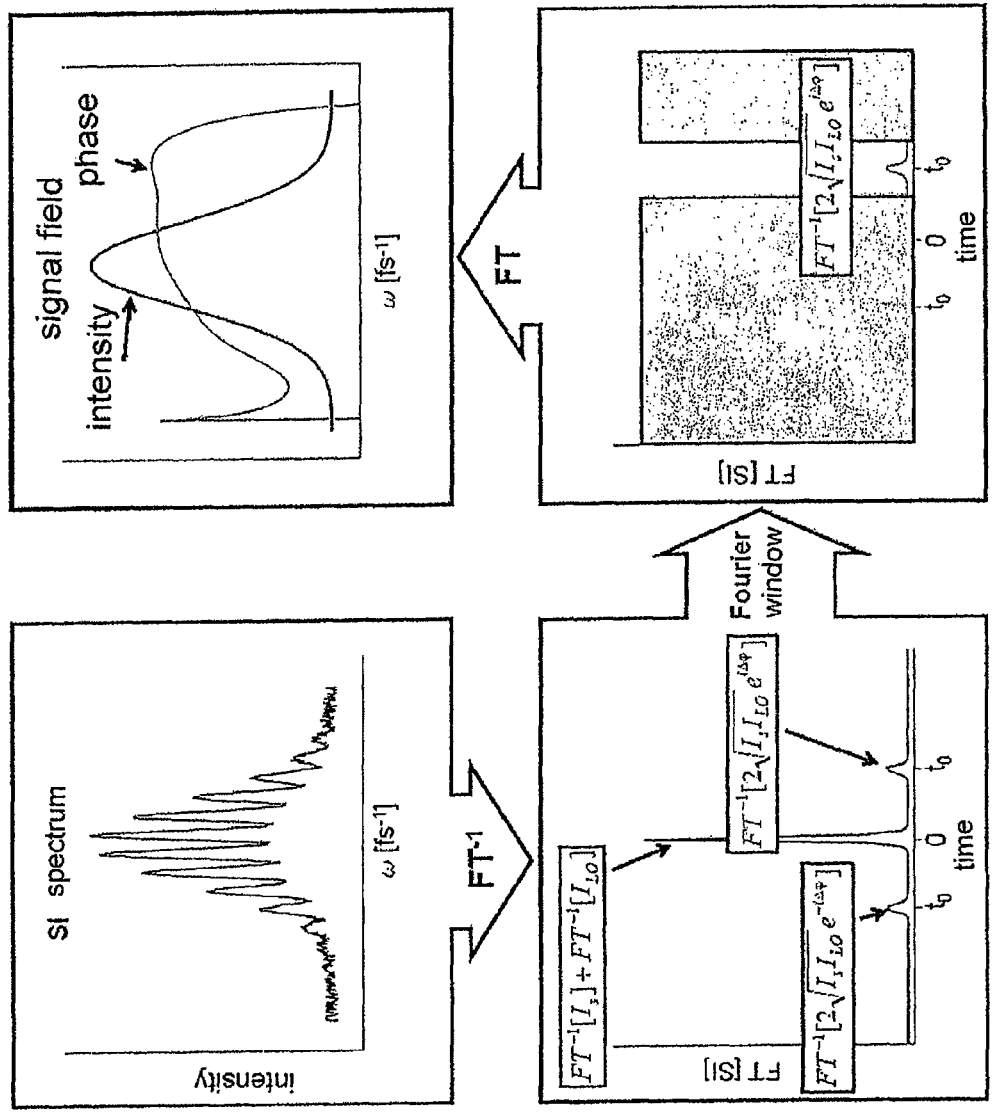
FIG. 7 shows a schematic illustration of the signal reconstruction from an interference spectrum.

In order to evaluate the data thus acquired and to generate an intuitive two-dimensional spectrum, the Fourier method described in connection with FIG. 7 is employed, generally as known in the field, but with small changes in consideration of the specific scan method when it comes to adjusting the time delays with respect to the pairwise guided beams. First possible stray terms are corrected, and then the intensity and phase of the signal are discerned from the spectral interference. The frequency axis of the emission is already given by the detection via the spectrometer. The excitation axis, however, is obtained by a Fourier transformation of the data recorded for all different coherence times. This way, a two-dimensional spectrum of the kind as shown in FIG. 1 is obtained, which represents a probability to absorb a photon with the frequency $\omega_\tau$ and to reemit a photon at a frequency $\omega_t$ after a population time T.

Although in the apparatus 10 of FIG. 4, pulses are varied pairwise by means of the variable delay lines 18 and 28, the time delays between the three excitation pulses, i.e. the coherence time r and the population time T can be set using the variable delay lines 18 and 28, as will be explained in more detail with reference to FIG. 8.

Starting from the situation in which all four pulses have a time overlap, first the fourth pulse is retarded with respect to the other three pulses by $\Delta t_{34,0}$, by tilting a compensation plate such that the fourth pulse (i.e. the LO) passes through glass for a distance which corresponds to about one picosecond. In this configuration, the LO therefore arrives last at the sample (see panel A of FIG. 8). This choice, however, is not essential, for example it would also be possible to delay the other three pulses, such that the LO arrives first at the sample.

Figure 8:
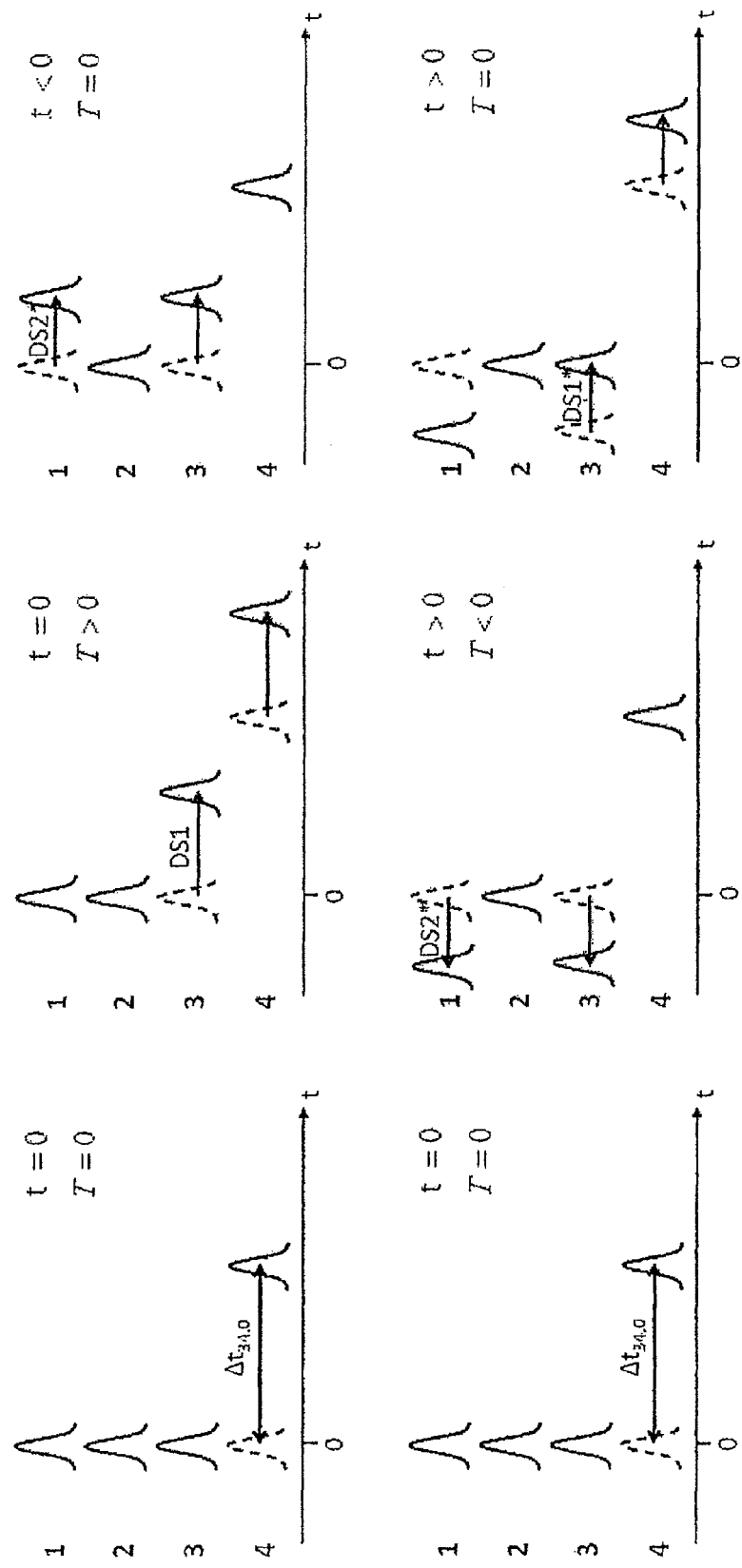
FIG. 8 shows six diagrams illustrating how the coherence and population times can be adjusted in the framework of the present invention.

A population time T other than zero is introduced by moving the moving mount or displacement table of the first delay line 18 (see panel B of FIG. 8). Negative values oft are obtained by moving the piezoactuator of the second delay line 28 such that the optical path for light pulses 1 and 3 increases, which means that these pulses arrive at the sample at a later time. At the same time, the temporal distance between the third and fourth light pulses decreases by |τ| (see panel C of FIG. 8, this is also true for T>0 if one starts out from the situation B described herein).

For positive values of τ, both piezoactuators have to be moved:

By operation of the piezoactuator at the second delay line 28, as before pulses 1 and 3 will be shifted in time with respect to pulses 2 and 4, however, this time in the other direction. This leads to a "negative population time", i.e. the time order of pulses 2 and 3 must later be corrected by moving the piezoactuator of the first delay line 18 (see panel F of FIG. 8). Panel F also applies for positive T, if the delay line 18 is moved according to a panel B toward larger times. In this case, the temporal distance from the third and fourth pulse increases by t.

Considering the sign of the coherence time, the following equation applies:

$$\Delta t_{34}(\tau) = \Delta t_{34,0} + \tau.$$

This relation has an impact on the data evaluation. The Fourier window shown in the lower right panel of FIG. 7, which should be positioned around the echo signal at t=τ, must be adapted to the values of the coherence time. In order to avoid discontinuities at τ=0, one always scans from $-|\tau_{max}|$ to $+|\tau_{max}|$.

Figure 2:
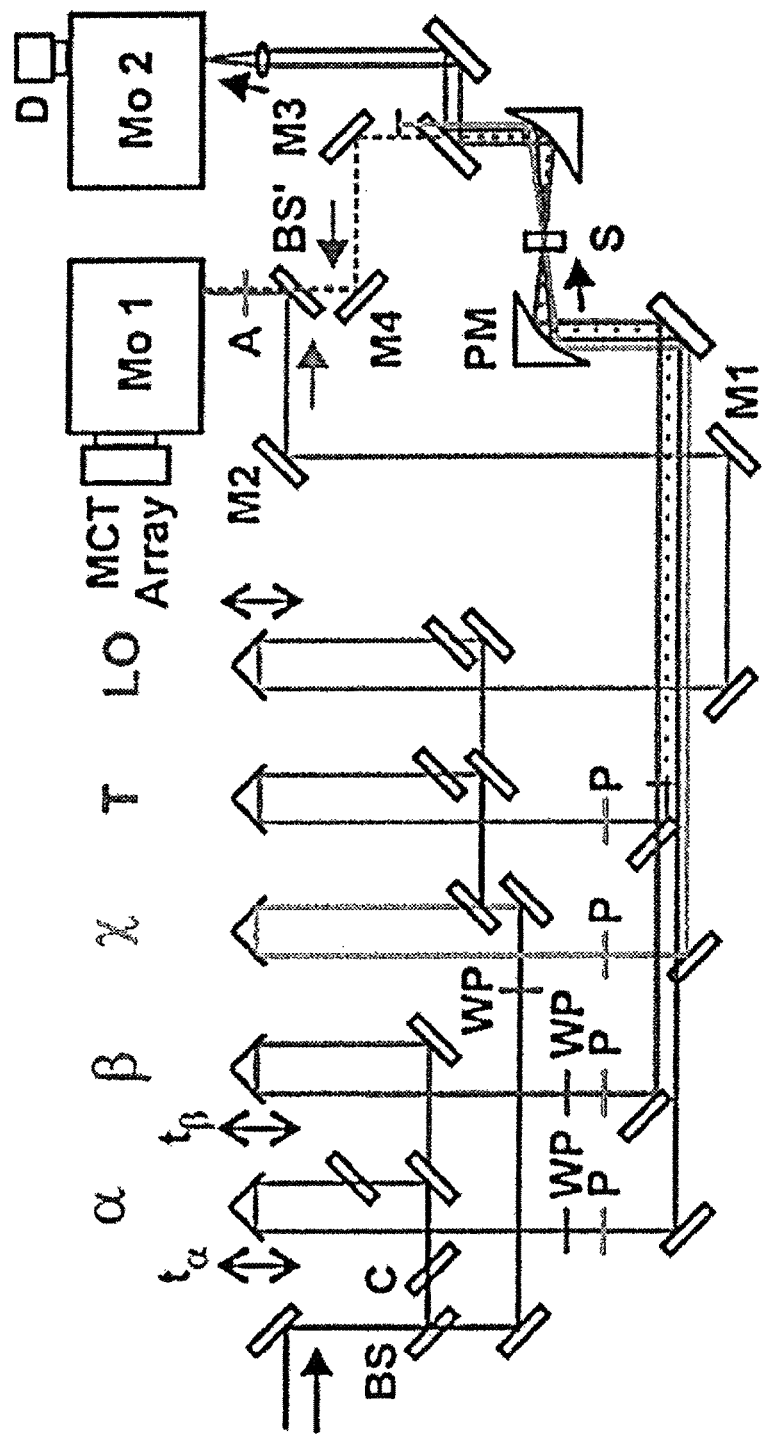
Figure 3:
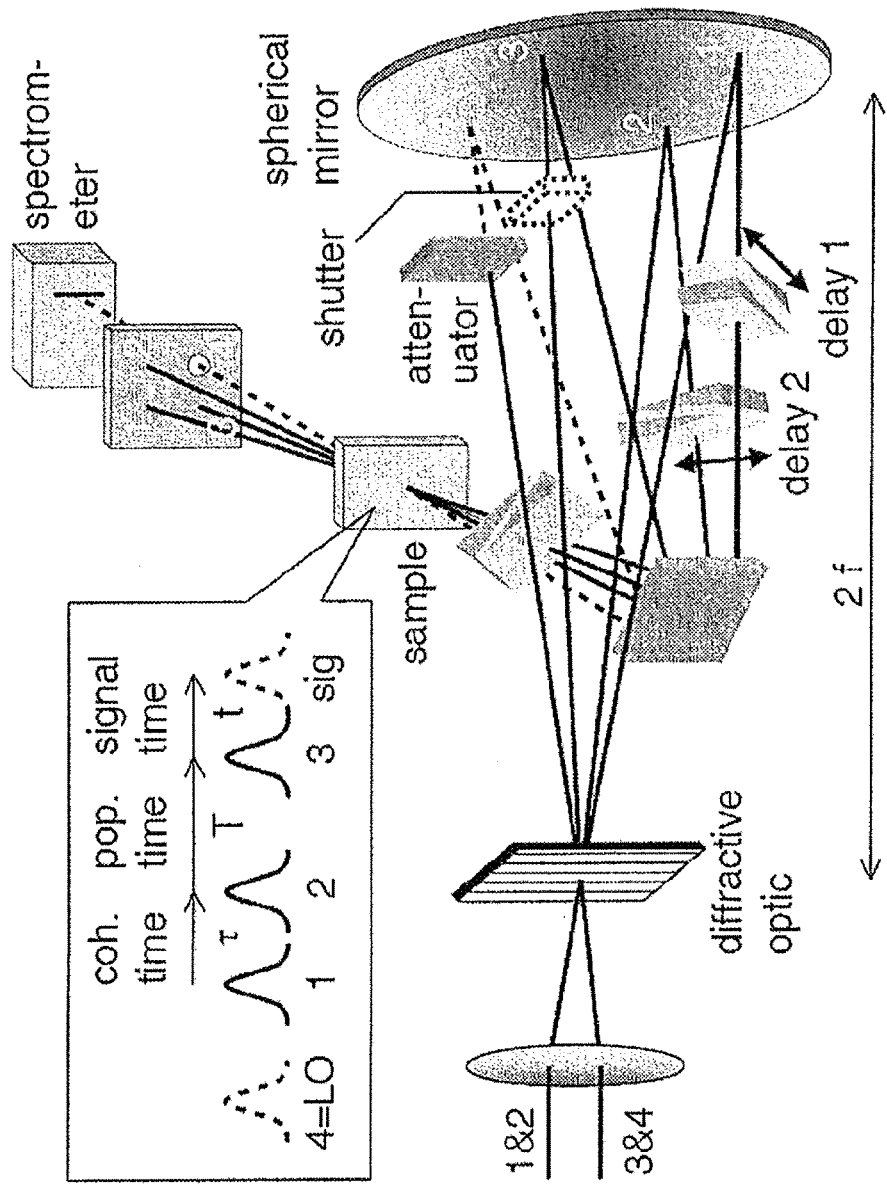

A further discussion of the invention can be found in the article "Inherently Phase-stable Coherent Two-dimensional Spectroscopy Using Only Conventional Optics", Optics Letters, Vol. 33, Nr. 23, pp. 2851-2853 of the present inventors, which has been filed after the priority day of the present application. In this article, measurements are provided which have been made with a device according to the setup described herein and which demonstrate the performance of the setup. In this regard, special reference is made to FIGS. 2(b) and 2(c) of this article which demonstrate the phase stability and the reproducibility. Also, in FIG. 3 2D spectra are shown that have been obtained with the apparatus and which demonstrate its functionality.

The invention claimed is:

1. An apparatus for coherent multi-dimensional optical spectroscopy, comprising
    an optical assembly, wherein the optical assembly comprises:
        means for splitting a base light pulse into at least a first light pulse, a second light pulse, a third light pulse and a fourth light pulse, where the first light pulse, the second light pulse and the third light pulse are suitable for interacting with a sample such as to generate an at least third order signal,
        focusing optics for focusing the first light pulse, the second light pulse, the third light pulse and the fourth light pulse at a site on the sample, and
        delay means adapted for varying respective arrival times of the first light pulse, the second light pulse, the third light pulse and the fourth light pulse at the sample site relative to each other,
    detection means for detecting an interference signal of the at least third order signal and the fourth pulse, wherein:
        the means for splitting the base light pulse include non-diffractive optics, the optical assembly is configured such that the light pulses between entrance of the base light pulse into the optical assembly and the focusing optics are at least for part of their optical paths guided pairwise in such a manner that changes in an optical path length due to a vibration of the means for splitting the base light pulse or due to an intentional variation using the delay means are, at least to a first order, identical for pulses of each pair, and the pulse pairs are chosen such that effects that the change in the arrival times of the pulses of each pair, due to a change in the optical path length have on the phase of the interference signal, at least partly compensate each other.

2. The apparatus of claim 1, wherein the non-diffractive optics comprise beam splitters selected from a group consisting of:

metal thin film beam splitter, dielectrically coated beam splitter, polarization-dependent beam splitter, prism beam splitter, pellicle beam splitter.

3. The apparatus according to claim 1, wherein the optical assembly comprises:

a first beam splitter splitting the base light pulse into a first partial beam and a second partial beam, a first delay means arranged in the light path of the second partial beam, a second beam splitter splitting the first partial beam into a first and a second light beam and splitting the second partial beam into a third and a fourth light beam, and a second delay means arranged in the light path of the first and third light beams.

4. The apparatus of claim 3 wherein:

the second partial beam is formed by the part of the base pulse passing the first beam splitter, the third and fourth light beams, which are generated at the second beam splitter from the second partial beam run in a first plane until reaching the focusing optics, the first partial beam is formed by the part of the base pulse which is reflected by the first beam splitter, and the first partial beam is deflected by a further mirror such that the first and second light beams, which are generated at the second beam splitter from the first partial beam run in a second plane until reaching the focusing optics.

5. The apparatus of claim 3, wherein the first light beam corresponds to the first light pulse, the second light beam corresponds to the second light pulse, the third light beam corresponds to the third light pulse and the fourth light beam corresponds to the fourth light pulse.

6. The apparatus according to claim 1, wherein the delay means comprise movable mirrors by movement of which the length of a light path of a light pulse which is deflected by the movable mirrors between the light source and the sample site can be varied.

7. The apparatus of claim 6, wherein the movable mirrors of at least one of the first or second delay means is configured to be moved using a motor-driven or a manually-adjustable mount and are additionally movable by piezoactuators.

8. The apparatus according to claim 1, wherein:

the focusing optics include a spherical mirror, and the optical assembly is configured such that the first to fourth light pulses impinge onto the spherical mirror along edges of an imaginary cuboid.

9. The apparatus according to claim 8, in which an aperture is provided which is configured to block the first to third light pulses after passing the sample and to pass the interference signal.

10. The apparatus according to claim 9, wherein downstream of the aperture a lens assembly is provided which is adapted to receive the interference signal and couple the interference signal into a single-mode fibre.

11. The apparatus according to claim 1, comprising at least one shutter mechanism for blocking at least one of the first, the second, the third or the fourth light pulse selectively.

12. The apparatus according to claim 1, wherein the detection means comprises a spectrometer adapted to detect the interference signal in frequency space.

13. The apparatus according to claim 1, wherein an additional delay means is provided in the light path of the fourth light pulse.

14. The apparatus according to claim 1, wherein the optical assembly is arranged in a housing.

15. The apparatus according to claim 1, further comprising a light source for generating the base light pulse, wherein the light source comprises a non-collinear optical-parametric amplifier.

16. The apparatus according to claim 1, further comprising a light source for generating the base light pulse wherein the base light pulse is configured to generate pulses having a relative spectral width $\Delta\lambda/\lambda$ of at least 0.2, where $\Delta\lambda$ corresponds to the width of the wavelength spectrum full-width half-maximum (FWHM) and $\lambda$ is the centre frequency of the base light pulse.

17. A method for coherent multi-dimensional optical spectroscopy comprising the following steps:

generating a base light pulse, splitting the base light pulse into at least a first, a second, a third and a fourth light pulse, wherein the first, the second and the third light pulses are adapted for interaction with a sample such as to generate an at least third order signal, focusing the first to fourth light pulses at a sample site using focusing optics and varying respective arrival times of the first to fourth light pulses at the sample site relative to each other using delay means, and detecting an interference signal of the at least third order signal and the fourth pulse, wherein:

the base light pulse is split using non-diffractive optics, the light pulses are for at least a part of their light paths guided pairwise such that changes in an optical path length due to vibrations of the means for splitting the base light pulse or due to an intentional variation using the delay means are, at least to a first order, identical for pulses of each pair, and the pulse pairs are chosen such that effects that the variation in the arrival times of pulses of a pair, due to the changes in the optical path length have on the phase of the interference signal, at least partially compensate each other.

18. The method of claim 17, wherein:

the base light pulse is split into a first partial beam and a second partial beam using a first beam splitter, the optical path length of the second partial beam is varied using a first delay means, the first partial beam is split into a first and a second light beam using a second beam splitter, the second partial beam is split into a third and a fourth light beam using said second beam splitter, and the optical path length of the first and the third light beams are varied using a second delay means.

19. The method of claim 18, wherein:

the second partial beam is formed by the part of the base light pulse which passes the first beam splitter, the third light beam and the fourth light beam, which are generated at the second beam splitter from the second partial beam run in a first plane until reaching the focusing optics, the first partial beam is formed by the part of the base light pulse which is reflected by the first beam splitter, and the first partial beam is deflected by a further mirror such that the first light beam and the second light beam, which are generated at the second beam splitter from the first partial beam run in a second plane until reaching the focusing optics.

20. The method according to claim 17, wherein the base light pulse has a relative spectral width $\Delta\lambda/\lambda$ of at least 0.2, wherein $\Delta\lambda$ corresponds to the width of the wavelength spectrum full-width half maximum (FWHM) of the base pulse (12) and $\lambda$ corresponds to the centre frequency of the base pulse.

* * * * *

UNITED STATES PATENT AND TRADEMARK OFFICE
CERTIFICATE OF CORRECTION

PATENT NO.       : 8,665,446 B2                                                                  Page 1 of 1
APPLICATION NO.  : 12/994607
DATED            : March 4, 2014
INVENTOR(S)      : Brixner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 601 days.

Signed and Sealed this

Twenty-ninth Day of September, 2015

Michelle K. Lee
*Director of the United States Patent and Trademark Office*